United States Patent
El-Wardany et al.

(10) Patent No.: US 10,710,161 B2
(45) Date of Patent: Jul. 14, 2020

(54) TURBINE DISK FABRICATION WITH IN SITU MATERIAL PROPERTY VARIATION

(71) Applicant: United Technologies Corporation, Hartford, CT (US)

(72) Inventors: Tahany Ibrahim El-Wardany, Bloomfield, CT (US); Matthew E. Lynch, Vernon, CT (US); Daniel V. Viens, Mansfield Center, CT (US); Robert A. Grelotti, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1644 days.

(21) Appl. No.: 14/202,195

(22) Filed: Mar. 10, 2014

(65) Prior Publication Data
US 2014/0255198 A1    Sep. 11, 2014

Related U.S. Application Data

(60) Provisional application No. 61/838,447, filed on Jun. 24, 2013, provisional application No. 61/775,818, filed on Mar. 11, 2013.

(51) Int. Cl.
| | |
|---|---|
| *F01D 5/00* | (2006.01) |
| *B22F 5/00* | (2006.01) |
| *B22F 3/105* | (2006.01) |
| *F01D 25/00* | (2006.01) |
| *F01D 5/02* | (2006.01) |

(Continued)

(52) U.S. Cl.
CPC ............ *B22F 5/009* (2013.01); *B22F 3/1055* (2013.01); *B23P 15/006* (2013.01); *F01D 5/02* (2013.01); *F01D 5/28* (2013.01); *F01D 25/005* (2013.01); *B22F 2003/1056* (2013.01); *B22F 2207/01* (2013.01); *B22F 2207/17* (2013.01); *F05D 2230/22* (2013.01); *F05D 2230/31* (2013.01); *F05D 2300/522* (2013.01); *Y02P 10/295* (2015.11); *Y02T 50/672* (2013.01); *Y10T 29/37* (2015.01)

(58) Field of Classification Search
CPC .......... B22F 3/1055; B22F 5/009; B22F 7/02; B29C 67/0077; F05D 2230/31; Y10T 29/49316; Y10T 29/49336; Y10T 29/49339; Y10T 29/49341; Y10T 29/49343
USPC .............. 416/229 A, 229 R; 29/23.51; 419/7
See application file for complete search history.

(56) References Cited

U.S. PATENT DOCUMENTS

| | | |
|---|---|---|
| 4,851,190 A | 7/1989 | Bowen et al. |
| 5,312,497 A | 5/1994 | Mathey |
| (Continued) | | |

*Primary Examiner* — Reinaldo Sanchez-Medina
(74) *Attorney, Agent, or Firm* — Carlson, Gaskey & Olds, P.C.

(57) ABSTRACT

A method of fabricating a functionally graded turbine engine component is disclosed and includes the step of depositing layers of powder onto a base and solidifying/fusing each layer with a first directed energy beam to define a component. The method further includes varying a process parameter between deposited layers to define different material properties within the component. The method also proposes surface enhancement approach that can be used after depositing each layer to locally customize the material properties. The method also proposes machining the different internal surfaces to achieve the proper surface finishing required.

15 Claims, 5 Drawing Sheets

(51) Int. Cl.
*F01D 5/28* (2006.01)
*B23P 15/00* (2006.01)

(56) References Cited

U.S. PATENT DOCUMENTS

| | | | |
|---|---|---|---|
| 5,393,482 A * | 2/1995 | Benda | B22F 3/1055 |
| | | | 264/40.1 |
| 6,355,086 B2 * | 3/2002 | Brown | B22F 3/1055 |
| | | | 428/539.5 |
| 7,537,725 B2 | 5/2009 | Groh et al. | |
| 7,967,924 B2 | 6/2011 | Groh et al. | |
| 8,261,444 B2 | 9/2012 | Calla et al. | |
| 2005/0133527 A1 * | 6/2005 | Dullea | B05B 7/14 |
| | | | 222/1 |
| 2009/0208752 A1 | 8/2009 | Shi | |
| 2011/0052412 A1 * | 3/2011 | Ader | B22F 3/1055 |
| | | | 416/97 R |
| 2011/0311389 A1 | 12/2011 | Ryan et al. | |
| 2012/0222306 A1 | 9/2012 | Mittendorf et al. | |
| 2013/0052442 A1 * | 2/2013 | Merrill | B22F 7/02 |
| | | | 428/220 |
| 2013/0101728 A1 | 4/2013 | Keremes et al. | |
| 2013/0101746 A1 | 4/2013 | Keremes et al. | |
| 2013/0112672 A1 | 5/2013 | Keremes et al. | |
| 2013/0180968 A1 * | 7/2013 | El-Wardany | B23K 26/0069 |
| | | | 219/121.73 |
| 2013/0195671 A1 * | 8/2013 | El-Wardany | F01D 5/286 |
| | | | 416/229 R |
| 2013/0287590 A1 * | 10/2013 | Neuhaeusler | B22F 3/1055 |
| | | | 416/241 R |
| 2014/0099476 A1 * | 4/2014 | Subramanian | B22F 5/009 |
| | | | 428/164 |

\* cited by examiner

TURBINE DISK FABRICATION WITH IN SITU MATERIAL PROPERTY VARIATION

CROSS REFERENCE TO RELATED APPLICATIONS

This application claims priority to U.S. Provisional Application No. 61/838,447 filed on Jun. 24, 2013 and U.S. Provisional Application No. 61/775,818 filed on Mar. 11, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. Structures of the turbine section experience high temperatures and stresses.

The temperature and stresses encountered within the turbine section necessitate material and processes utilized to fabricate turbine components. Processes and materials utilized for fabricating turbine components such as turbine disks are tailored to achieve a structure with material properties that can withstand the high temperature environment, provide good strength, stability and damage tolerance with residual stress levels within desired limits.

Accordingly, engine manufacturers continue to seek new processes for fabricating components such as turbine disks and other turbine engine components that improve material properties, part performance without the increase in the manufacturing cost or time to market.

SUMMARY

A method of fabricating a functionally graded turbine engine component according to an exemplary embodiment of this disclosure, among other possible things includes depositing layers of powder onto a base, solidifying and fusing each layer with a first directed energy beam to define a component, and varying a process parameter between deposited layers to define different material properties within the component.

In a further embodiment of the foregoing method, includes using a second directed energy beam for heat treating the deposited layers of powder to locally generate a desired microstructure.

In a further embodiment of any of the foregoing methods, includes laser shock peening of a solidified layer prior to depositing a subsequent layer of powder to induce compressive residual stress.

In a further embodiment of any of the foregoing methods, includes utilizing a deep rolling tool to induce cold working at a surface of a solidified layer prior to depositing a subsequent layer of powder material.

In a further embodiment of any of the foregoing methods, includes deep rolling a solidified layer to obtain a desired strength of material and surface microstructure.

In a further embodiment of any of the foregoing methods, includes varying the energy level from the first directed energy beam to vary a density of a solidified layer of powder.

In a further embodiment of any of the foregoing methods, includes varying a powder size between layers to define different material properties within the component.

In a further embodiment of any of the foregoing methods, includes varying a composition of the powder between layers to define material properties within the component.

In a further embodiment of any of the foregoing methods, includes the step of finish machining an internal surface of the component and sealing the internal surface within the component with subsequent solidified and fused layers of powder.

In a further embodiment of any of the foregoing methods, the component includes a turbine disk including a hub and a rim and the method includes the step of machining the deposited layers to provide a desired surface finish.

In a further embodiment of any of the foregoing methods, layer specifications are determined utilizing a structural optimization methodology.

A method of fabricating a turbine disk according to an exemplary embodiment of this disclosure, among other possible things includes depositing layers of powder onto a base, solidifying and fusing each layer with a first directed energy beam to define the turbine disk, and varying a process parameter between deposited layers to define different material properties within the turbine disk.

In a further embodiment of the foregoing method, includes depositing layers along a plane transverse to an intended axis of rotation of the turbine disk.

In a further embodiment of any of the foregoing methods, includes using a second directed energy beam for heat treating of a solidified layer to induce compressive residual stress into solidified layers of powder.

In a further embodiment of any of the foregoing methods, includes deep rolling a solidified layer to obtain a desired microstructure and enhance the surface properties by inducing compressive residual stress.

In a further embodiment of any of the foregoing methods, includes varying one of an energy level from the first directed energy beam, a powder size and powder compositions to vary a density between solidified layers of powder.

In a further embodiment of any of the foregoing methods, layer specifications are determined utilizing a structural optimization methodology.

A turbine disk according to an exemplary embodiment of this disclosure, among other possible things includes multiple layers of material having differing mechanical properties.

In a further embodiment of the foregoing turbine disk, the layers of material include layers of different densities.

In a further embodiment of any of the foregoing turbine disks, the layers of material include layers of different materials.

In a further embodiment of any of the foregoing turbine disks, the layers of material include layers fabricated utilizing powder of different size.

In a further embodiment of any of the foregoing turbine disks, the layers of material include layers fabricated utilizing a cold working process between adjacent layers.

In a further embodiment of any of the foregoing turbine disks, the layers of material are orientated transverse to an intended axis of rotation of the turbine disk.

In a further embodiment of any of the foregoing turbine disks, at least two of the layers of material include different fatigue-crack-growth properties.

In a further embodiment of any of the foregoing turbine disks, at least two of the layers of material include different thermal growth properties.

In a further embodiment of any of the foregoing turbine disks, at least two of the layers of material include different residual stress states.

In a further embodiment of any of the foregoing turbine disks, at least two of the layers of material include different local anisotropy corresponding to a desired mechanical property.

In a further embodiment of any of the foregoing turbine disks, layer specifications are determined utilizing a structural optimization methodology.

A machine for fabricating an aircraft component according to an exemplary embodiment of this disclosure, among other possible things includes a workspace including a base plate, a material depositor for depositing powder within the workspace, a first directed energy beam for solidifying a deposited layer of powder within the workspace, and a surface treatment device for mechanically treating a solidified layer of powder in-situ.

In a further embodiment of the foregoing machine, includes a second directed energy device for surface treating a solidified layer of powder.

In a further embodiment of any of the foregoing machines, in the surface treatment device includes a deep rolling tool modifying the stress state and microstructure of a solidified layer of powder.

In a further embodiment of any of the foregoing machines, includes a rotating tool for finishing a surface of solidified powder within the workspace.

In a further embodiment of any of the foregoing machines, includes a controller governing operation of the machine to fabricate an aircraft component having layers of different material properties.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
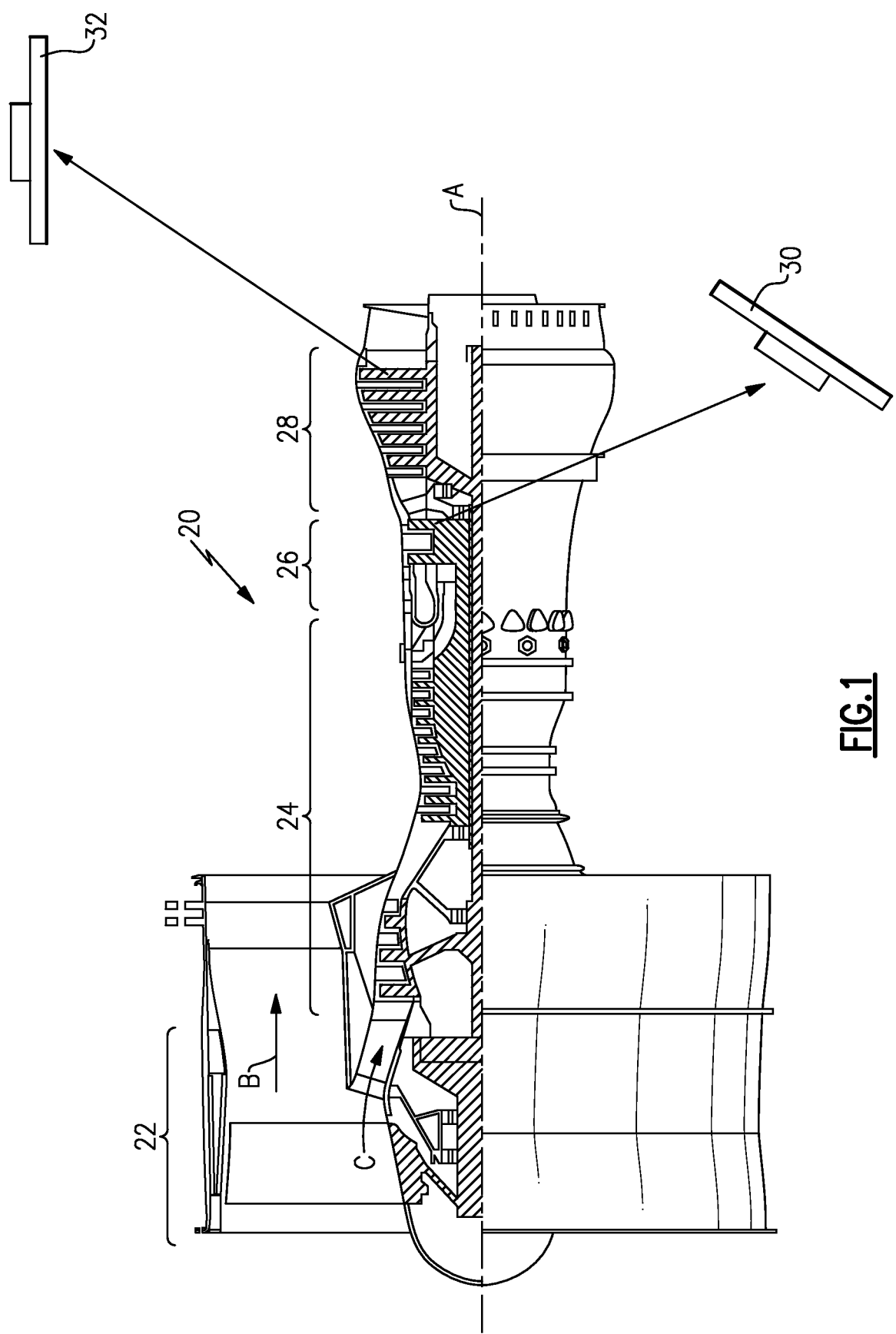
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-pressure exhaust gas stream that expands through the turbine section 28 where energy is extracted and utilized to drive the fan section 22 and the compressor section 24.

The engine 20 includes several high-pressure turbine disks 30 and several low-pressure turbine disks 32. The turbine section 28 is exposed to the highest temperatures and stresses within the engine during operation. Operating temperatures within the turbine sections determine the materials and processes for fabricating the turbine disks 30, 32. The specific materials that are required must withstand the high operating temperatures, provide good stability with low crack growth rates and maintain strength at the elevated operating temperatures. Moreover, the specific design and configuration of the disks 30, 32 must provide for the reduction of fatigue crack growth and must have favorable damage tolerance characteristics.

Nickel-based alloys utilized for the turbine disks 30, 32 generate several process orientated characteristics that include component residual stresses, alloy stability and the presence of certain defects. Residual stresses are locked-in thermal stresses that primarily originate from solution heat treatment cycles. Heat treat cycles rapidly cool an alloy from the heat treat temperature. Variation in the cooling rates from the surface of the turbine disks 30, 32 towards the center result in large thermal residual stresses that can cause cracks that remain within the disk. Accordingly, there are improved processes and approaches to reduce the cost, and optimize disk material properties and characteristics of completed turbine disks 30, 32.

Figure 2:
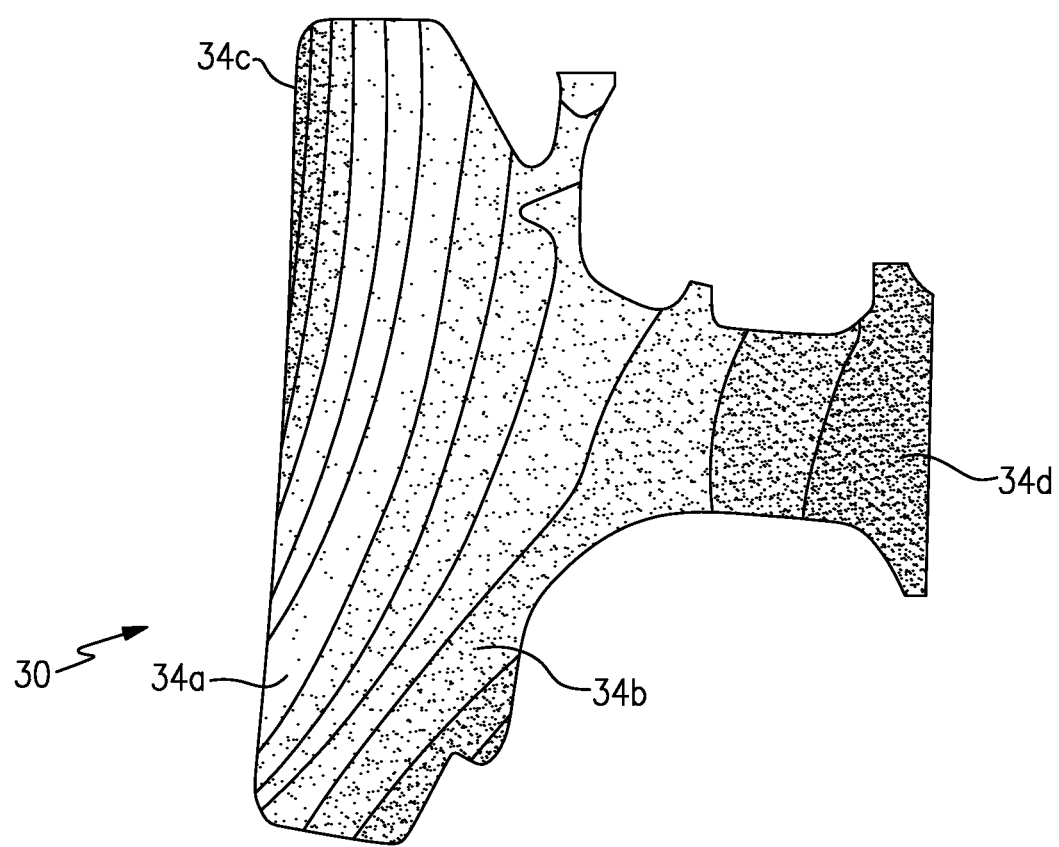
FIG. 2 is a cross sectional view of an example turbine disk illustrating effective plastic strain within the turbine disk during burst analysis.

Referring to FIG. 2, an example high-pressure turbine disk 30 is illustrated in an effective plastic strain diagram, including various locations of plastic strain regions indicated at 34a, 34b, 34c and 34d. Each of the strain regions 34a must be within desired parameters for operational performance. Moreover, areas of particularly high plastic strain and consequently stress are to be reduced by the use of specific materials or disk configurations. In this example, a high plastic strain and corresponding stress region is indicated at 34c. The configuration and materials selection of the turbine disk 30 can only provide a certain level of plastic strain/stress reduction and improvements to material properties. Accordingly, it is desired to further improve the material properties and performance of a disk 30.

Figure 3:
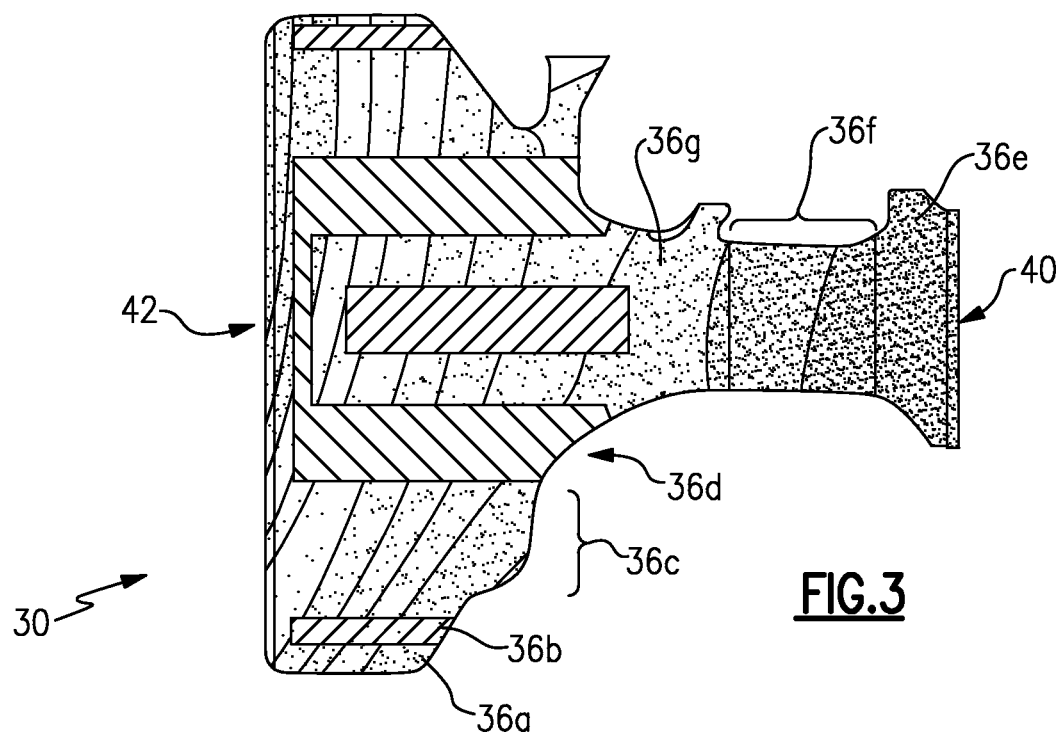
FIG. 3 is a cross sectional view of an example of proposed turbine disk that include different layers of material having different material properties with highest mechanical properties at the outer rim and lowest mechanical properties at the inner rim.

Referring to FIG. 3, a turbine disk 30 fabricated according to the present invention includes a number of layers of material 36a-g that each are fabricated to provide different material mechanical properties. The material properties of each layer are tailored to withstand specific stresses and loads encountered in a portion of the disk. The material properties of each layer may be specified through application of a structural and/or multi-physics optimization methodology. The material properties of each layer can be varied by using material of different densities, different compositions and/or particle size. Moreover, each layer can be varied by adjusting process specific formation parameters. In addition, by utilizing a customized deep rolling process after the deposition of each layer, a compressive residual stress of a specific residual stress profile that is defined earlier by the designer can be induced to the deposited layer leading to an increase in the disc fatigue resistance.

Figure 4:
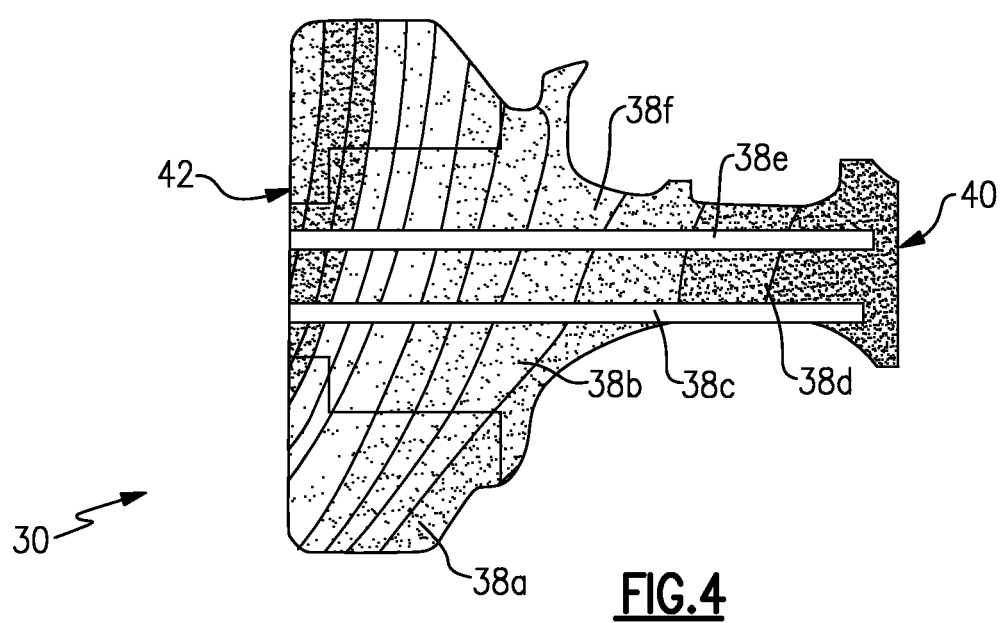
FIG. 4 is a cross sectional view of an example of proposed disk including different layers of material providing a variable residual stress state induced during forging and machining of the disk.

Referring to FIG. 4 with continued reference to FIG. 3, the example turbine disk 30 is shown with different regions of residual stresses 38a-f that correspond with the different materials located and provided by the different layers 36a-g. Accordingly, residual stresses in the turbine disk 30 are locally varied to accommodate localized performance requirements and stresses based on material properties provided by each of the layers 36a-g. This cannot be achieved except by hybrid integration of an additive manufacturing process and the deep rolling process.

The disclosed turbine disk 30 is fabricated as a composite material by varying material properties layer by layer throughout the turbine disk 30 to optimize mechanical properties of the alloy and material to tailor the chemistry and microstructure features to enhance strength, temperature capability, improve damage tolerance and define residual stress characteristics in a localized manner within the turbine disk 30. The implementation of layer by layer material property selection and formation provides a functionally graded material that allows portions of the turbine disk 30 to be tailored to accommodate and optimize the material structure to accommodate localized temperatures and stresses. The material properties of each layer may be specified through application of a structural and/or multi-physics optimization methodology.

Each layer of the disk 30 from a rim 40 to a bore 42 is designed to have a specific local layer orientation in one direction that corresponds to specific desired mechanical properties required of that localized region of the disk 30. In this example, the layers are orientated transverse to an intended axis of rotation of the turbine disk 30. Moreover, at least two of the layers of material include different local anisotropy corresponding to a desired mechanical property.

The specific layers 36a-g are formed by an additive manufacturing process that applies and builds layer upon layer until a completed part such as the example turbine disk 30 is complete. Each of the layers 36a-g can be formed with different densities and different material compositions. Moreover, each layer can be formed from powder of differing size and different scanning speed and process parameters that is assigned to that specific layer to provide different densities. The different densities can also be formed by varying power of the directed energy device forming that layer. The properties of each layer may be specified through application of a structural and/or multi-physics optimization methodology.

Figure 5:
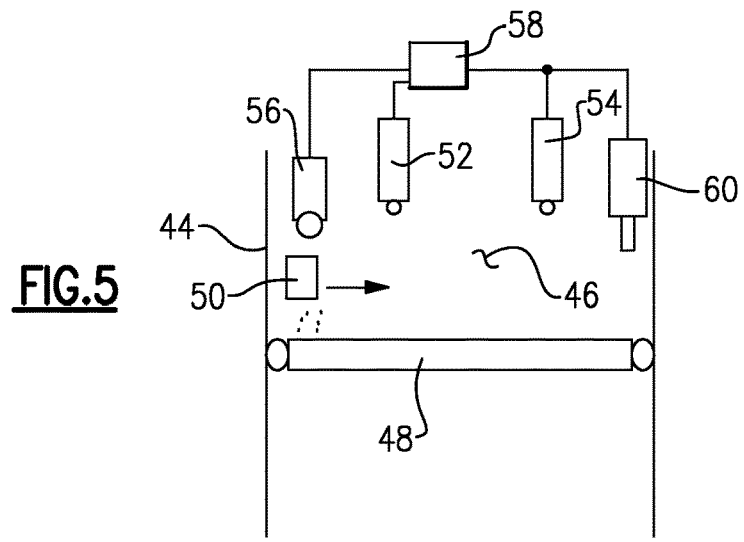
FIG. 5 is a schematic view of an example hybrid additive/subtractive/surface enhancement manufacturing system that can be used for producing an example turbine disk with customized material properties and residual stress profile.

Referring to FIG. 5, an example additive manufacturing machine 44 for creating a functionally graded turbine disk includes a workspace 46 with a base plate 48. A first directed energy beam 52 is provided to direct energy onto powder material laid down on the base plate 48. In this example the directed energy beam comprises a laser beam 52. Some additive manufacturing systems utilize a material depositor 50 that lays a powder metal material onto the base 48. Both powder bed laser or electron beam melting process and/or powder feeder laser or electron beam melting process can be used. In addition, a wire deposition system can also be used. The heat source (laser beam or electron beam) 52 then scans over the base 48 and melts powder material in a pattern and configuration corresponding with a layer of the desired final component geometry. The melted material solidifies and before subsequent layers are applied to existing layer, deep rolling process or another laser peening process can be used to treat the surface of the layer and enhance its property. The two processes keep repeating to form the completed part.

The example machine 44 includes a second energy directing device 54 that provides a surface and heat treatment to the solidified layers. The second laser beam 54 may provide, for instance, a laser peening treatment to intermediate layers of the component. Accordingly, the second laser beam 54 can be utilized to surface or heat-treat layers of material once solidified to produce desired material properties and structures at different layers within the completed component part.

The example machine 44 also includes a machine tool 60 that can remove material during manufacture to produce desired surface finishes at intermediate stages of the process. In one example, the machine tool 60 is a milling tool that removes material an intermediate layer to produce a desired surface finish. The surface may include a surface that will be concealed in the completed part. However, as the additive manufacture process builds a part layer by layer, surfaces that will be enclosed in the completed part can be machined, treated or otherwise finished and then subsequently closed off by additional layers of material.

The example machine 44 further includes a tool for cold working a surface to impart a desired microstructure or residual stress state. In this example a deep rolling tool 56 is included and provides for the surface finishing and treatment of surfaces during component build up. Moreover, the deep rolling tool 56 can also be utilized on the final outer surface of a completed part to impart desired surface material characteristics. Each of the features of the machine 58 are governed by a controller 58 that coordinates operation of the tools and energy devices to create a part with varied material properties that are tailored layer by layer.

Figure 6:
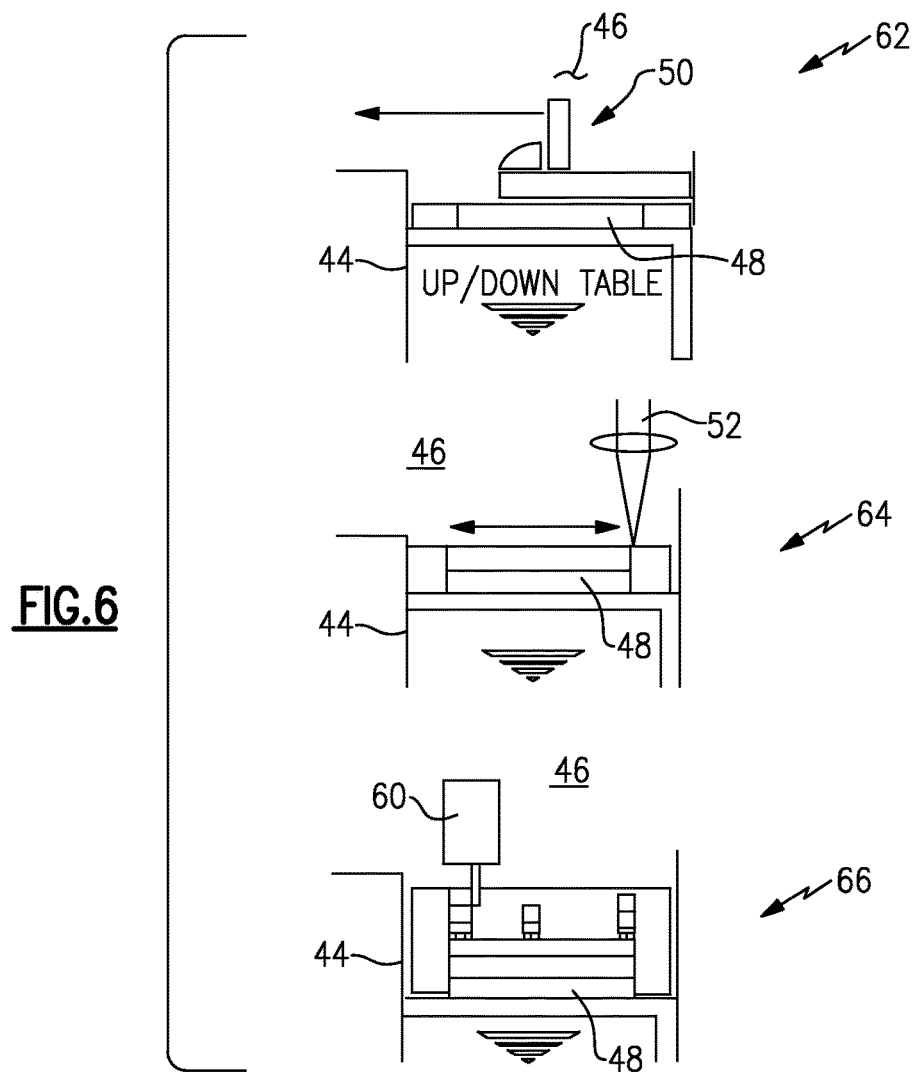
FIG. 6 is a schematic illustration of the example hybrid method for fabricating a layered turbine disk having varied material properties and localized compressive residual stress profile.

Referring to FIG. 6 with continued reference to FIG. 5, the example process for fabricating the functionally graded turbine disk 30 utilizes an additive manufacturing process where metal powder is laid down by the depositor 50 as indicated at 62 within the workspace 46 onto the base 48. The first laser 52 is then utilized to melt portions of the powder laid down on the base 48 in the form of the desired part. The subsequent layers are built upon the initial layer to form the disk 30 layer by layer until the part configuration and overall desired geometry is obtained.

The table 48 that moves in response to the application of a metal powder to maintain a desired focus by the laser 52 as is schematically shown at 64. In the disclosed process each layer or group of layers are formed depending on the desired material properties for that specific layer. The layers may be varied by utilizing a powder material of a different size and/or by varying amount of energy to melt the powder material.

The milling tool 60 is utilized on the part while it is being fabricated as is schematically indicated at 66. The milling tool 60 can be utilized to finish machine or otherwise modify layers that are applied during the additive manufacturing process during the fabrication process. Moreover, internal features that otherwise would not be accessible after completion of the part can be finished machined utilizing the milling tool 60 that is part of the example additive manufacturing machine 44.

Accordingly, the example process combines additive metal laser sintering/melting processes to grow a component from powder and also provides the ability to finish machine whole parts or sections of a part to a desired surface finish with very high accuracies. Material properties of each layer, including porous structures, can be changed by varying the laser focus, power, or varying the densities of material with this method. The material properties can also be customized by using the deep roller process or laser shock peening process after each layer. The properties of each layer may be specified through application of a structural and/or multi-physics optimization methodology.

Figure 7:
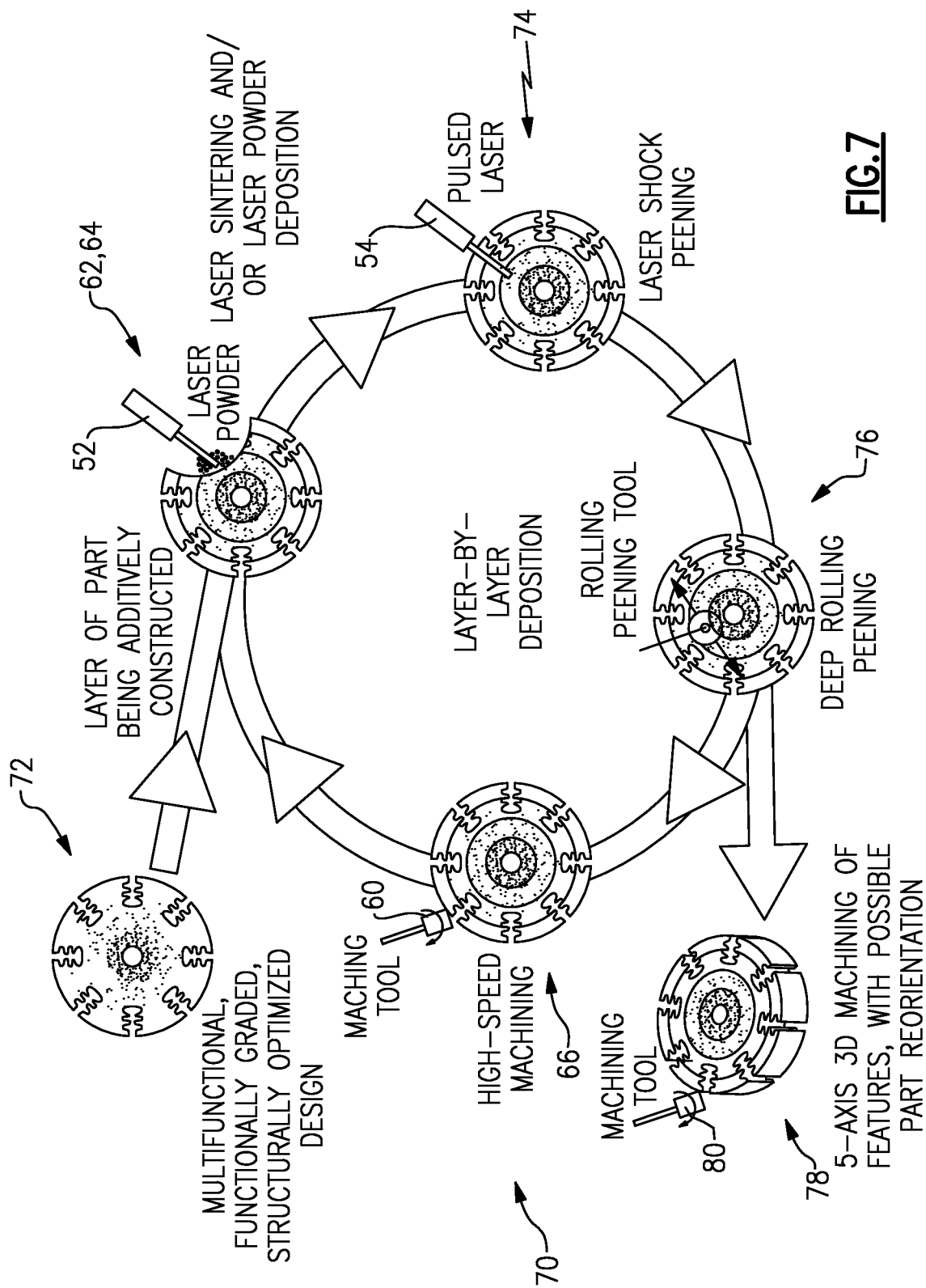
FIG. 7 is another schematic view of the example process for fabricating a turbine disk by the present invention.

Referring to FIG. 7, with continued reference to FIGS. 5 and 6, the example fabrication method is schematically shown and indicated at 70 and includes the initial step of determining the material properties of the functionally graded turbine disk layer by layer. The design includes parameters for material, density and microstructure for each layer of the completed part that is determined by analysis of stresses and other operational factors encountered during operation and a selection of material properties that best addresses and accommodates those stresses. The design includes a layout, layer by layer, of the component, in this instance, the high pressure turbine disk 30 of graded material composition, density and microstructure.

The turbine disk 30 is then fabricated utilizing the additive manufacturing process of depositing powder followed by melting and solidifying portions of the powder as indicated at 62 and 64.

The example process includes the use of the second laser beam 54 to thermal or mechanical treat a surface of a layer in a strain reducing process or a laser shock peening process on a previously solidified layer of powder material as is indicated at 74. The laser shock peening process generates a predicted amount of residual stress within a layer according to the design 72. The laser shock peening process can be utilized on each solidified layer or can be utilized on select solidified layers to provide the desired material properties and stress characteristics for each layer within the disk.

A solidified layer of powder material may also be cold worked to further refine the surface layer microstructure and enable higher operating temperatures and loads as is indicated at 76. In this example, a deep rolling process is utilized during the additive manufacturing process between the application and solidification of subsequent layers. As shown, each layer can be both laser shock peened and deep rolled to provide the desired material properties and characteristics. Moreover, such laser shock peening and deep rolling can be utilized in any combination on various layers within the disk during fabrication to further provide for the functional grading and variation in material properties and characteristics within the disk 30.

One of the last steps in fabrication of the disk is the machining of the outer surface to include machining of the slots to hold turbine blades as is commonly understood and schematically shown at 66. In this example, the machine for fabricating the disk 30 includes the machining tool 60 that can be utilized to fabricate the slots in-situ thereby increasing the accuracy of producing the disk 30 and improving process efficiency.

Minimum material may need to be removed from the surface because the surface finish of the can be controlled through the proper selection of powder size. In one example, the powder size may range from between 20 and 25 microns.

The external surface will be finished using a five axis milling machine as indicated at 78 to obtain a required final surface finish. The final finishing may be conducted on the same machine using the milling tool 60 or may be moved to a secondary machine and finished with 5-axis machining center using a cutting tool indicated at 80 for completing external features.

The disclosed method reduces the expensive tooling required to forge the disks and the number of fabricating processes. The utilization of additive manufacturing reduces the amount of material used to forge the part and then removed as chips during the machining of the part. By utilizing the additive manufacturing process in combination with the laser shock peening and cold working steps provided by the deep rolling processes the part will be manufactured from powder and the amount of material need will be reduced by at least 40%. The example steps are repeated in a desired order and combination to provide a disk 30 of a desired geometry and variable material properties for use in an example gas turbine engine 20. Moreover, although the example method is described by way of fabrication of a turbine disk, other components that would benefit from varied material properties and functionally graded features could also be fabricated utilizing the disclosed process.

Accordingly, the method and functionally graded component that is provided in the example disclosure provides a cost-effective production approach for producing a functionally graded turbine disk with differing material properties in different regions and layers that can reduce processing costs and time while enhancing overall material properties, strength and characteristics of the turbine disk. The effectiveness can be enhanced by specifying tailored layers through application of a structural and/or multi-physics optimization methodology.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of fabricating a functionally graded turbine engine component comprising:
depositing layers of powder onto a base;
solidifying and fusing each layer with a first directed energy beam to define a component; and
varying a process parameter between deposited layers to define different material properties within the component, further comprising varying the energy level from the first directed energy beam to vary a density of a solidified layer of powder.

2. The method as recited in claim 1, further comprising using a second directed energy beam for heat treating the deposited layers of powder to locally generate a desired microstructure.

3. The method as recited in claim 1, further comprising laser shock peening of a solidified layer prior to depositing a subsequent layer of powder to induce compressive residual stress.

4. The method as recited in claim 1, further comprising utilizing a deep rolling tool to induce cold working at a surface of a solidified layer prior to depositing a subsequent layer of powder material.

5. The method as recited in claim 1, further comprising deep rolling a solidified layer to obtain a desired strength of material and surface microstructure.

6. The method as recited in claim 1, further comprising varying a powder size between layers to define different material properties within the component.

7. The method as recited in claim 1, further comprising varying a composition of the powder between layers to define material properties within the component.

8. The method as recited in claim 1, further comprising the step of finish machining an internal surface of the component and sealing the internal surface within the component with subsequent solidified and fused layers of powder.

9. The method as recited in claim 1, wherein the component comprises a turbine disk including a hub and a rim and the method comprises the step of machining the deposited layers to provide a desired surface finish.

10. The method as recited in claim 1, wherein layer specifications are determined utilizing a structural optimization methodology.

11. A method of fabricating a turbine disk comprising:
depositing layers of powder onto a base;
solidifying and fusing each layer with a first directed energy beam to define the turbine disk;
varying a process parameter between deposited layers to define different material properties within the turbine disk; and
heat treating a solidified layer using a second directed energy beam to induce compressive residual stress into solidified layers of powder.

12. The method as recited in claim 11, further comprising depositing layers along a plane transverse to an intended axis of rotation of the turbine disk.

13. The method as recited in claim 11, further comprising deep rolling a solidified layer to obtain a desired microstructure and enhance the surface properties by inducing compressive residual stress.

14. The method as recited in claim 11, further comprising varying one of an energy level from the first directed energy beam, a powder size and powder compositions to vary a density between solidified layers of powder.

15. The method as recited in claim 11, wherein layer specifications are determined utilizing a structural optimization methodology.

* * * * *